United States Patent
Imamura et al.

(10) Patent No.: US 6,175,219 B1
(45) Date of Patent: Jan. 16, 2001

(54) BOOSTER TYPE CONVERTER WITH LOW POWER LOSS

(75) Inventors: Noritoshi Imamura; Katsumi Kobori, both of Miyagi (JP)

(73) Assignee: Sony Corporation, Tokyo (JP)

( * ) Notice: Under 35 U.S.C. 154(b), the term of this patent shall be extended for 0 days.

(21) Appl. No.: 09/382,547

(22) Filed: Aug. 25, 1999

(30) Foreign Application Priority Data

Aug. 27, 1998 (JP) .................................................. 10-242099

(51) Int. Cl.[7] .............................. G05F 1/10; G05F 1/652
(52) U.S. Cl. ........................... 323/222; 363/97; 363/131
(58) Field of Search .............................. 363/20, 21, 95, 363/97, 131; 323/222

(56) References Cited

U.S. PATENT DOCUMENTS

| | | | |
|---|---|---|---|
| 5,402,329 | * | 3/1995 | Wiitenbreder, Jr. .................. 363/127 |
| 5,457,379 | * | 10/1995 | Jacobs et al. ......................... 323/222 |
| 5,477,131 | * | 12/1995 | Gegner .................................. 323/222 |
| 5,481,449 | * | 1/1996 | Kheraluwala et al. ................ 363/17 |
| 5,748,457 | * | 5/1998 | Poon et al. ............................. 363/16 |
| 5,774,346 | * | 6/1998 | Poon et al. ............................. 363/17 |
| 5,856,916 | * | 1/1999 | Bonnet .................................. 363/20 |
| 5,880,940 | * | 3/1999 | Poon ..................................... 363/20 |
| 6,018,469 | * | 1/2000 | Poon ..................................... 363/20 |

* cited by examiner

*Primary Examiner*—Peter S. Wong
*Assistant Examiner*—Bao Q. Vu
(74) *Attorney, Agent, or Firm*—Frommer Lawrence & Haug, LLP.; William S. Frommer; Bruno Polito

(57) ABSTRACT

A booster type converter (19) wherein a boosting inductor is constituted from a transformer (20) provided with an auxiliary winding (20*b*), a capacitor (26) is connected to the auxiliary winding, whereby the capacitor is charged by means of resonance of a leakage inductance of the transformer (20) and the capacitor (26), and at the same time, it makes possible to conduct zero voltage switching of the booster type converter (19) on the basis of the electric charge charged in the capacitor, whereby it is intended to attain high efficiency in the booster type converter.

2 Claims, 5 Drawing Sheets

BOOSTER TYPE CONVERTER WITH LOW POWER LOSS

BACKGROUND OF THE INVENTION

1. Field of the Invention

The present invention relates to a booster type converter.

2. Description of the Related Art

Heretofore, a booster type converter by which a DC output having a prescribed voltage value higher than that input from a DC power source can be supplied to a load by controlling a switching duty of a boosting switching element in the booster type converter has been widely used as a power unit for electronic and electrical equipments.

FIG. 1A is a block diagram showing an example of a conventional booster type converter 1. This booster type converter 1 comprises a DC power source 3, a + output terminal 3a of the DC power source 3, a − output terminal 3b of the DC power source 3, a reactor coil unit 5, a power MOSFET element 7, a main diode element 9, a smoothing capacitor 11, a + output terminal 13a, a − output terminal 13b, and a control circuit 14.

The booster type converter 1 is constituted in such that the + output terminal 3a of the DC power source 3 is connected to an end of the reactor coil unit 5, a drain side of the power MOSFET element 7 is connected to the other end of the reactor coil unit 5, a source side of the power MOSFET element 7 is connected to the − output terminal 3b of the DC power source 3, a connecting midpoint between the drain side of the power − MOSFET element 7 and the other end of the reactor coil unit 5 is connected to an anode side of the main diode element 9, a cathode side of the main diode element 9 is connected to the + output terminal 13a, a + pole side of the smoothing capacitor 11 and a control signal input end 14a of the control circuit 14 are connected to a connecting midpoint between the cathode side of the main diode element 9 and the + output terminal 13a, a switching signal output end 14b of the control circuit 14 is connected to a gate side of the power MOSFET element 7, the source side of the power MOSFET element 7 is connected to a − pole side of the smoothing capacitor 11, and this contact point is connected to the − output terminal 13b, respectively.

In the above described constitution, it is intended to arrange that a voltage produced in the reactor coil unit 5 is cumulated to a voltage value of the DC power source 3, and the resulting voltage is accumulated in the smoothing capacitor 11 through the main diode element 9 for discharging the energy during an OFF period of a switching signal which energy is accumulated in the reactor coil unit 5 during an ON period of the switching signal supplied to the gate side of the power MOSFET element 7 by controlling respective ratios of time width in respect of the OFF period and the ON period in the switching signal supplied to the gate side of the power MOSFET element 7 in the control circuit 14 based on an output voltage value of the +output terminal 13a in such that an output voltage value defined between the + output terminal 13a and the − output terminal 13b is kept constant at a predetermined value, whereby a voltage having a constant voltage value which is obtained by elevating a voltage value of the DC power source 3 can be applied to a load from the +output terminal 13a and the − output terminal 13b.

It is to be noted that a period designated by "OFF" represents such a period wherein a switching signal supplied to the gate of the power MOSFET element 7 from the switching signal output end 14b of the control circuit 14 is in an OFF state, while a period designated by "ON" represents such a period wherein the switching signal is in an ON state, respectively, in FIG. 1B.

In the booster type converter 1 shown in FIG. 1A, because of production of an overlapped area designated by VIW of a voltage VDS existing between the drain and the source of the power MOSFET element 7 and a drain current ID as shown in FIG. 1B at the time when the switching signal supplied from the switching signal output terminal 14b of the control circuit 14 to the gate of the power MOSFET element 7 is turned from an "ON" state to an "OFF" state as shown in a waveform of FIG. 1B, a switching loss is generated at the power MOSFET element 7 in the overlapped area VIW, and heat is generated in the element 7 due to electric power loss derived from the above described loss, thereby to decrease a DC—DC conversion efficiency of the booster type converter 1.

Since an amount of the heat generation increases in proportional to a switching frequency value of the element 7, there has been such a disadvantage in that an improvement in the switching frequency value is limited in view of restrictions of prevention in thermal breakdown of the power MOSFET element 7.

SUMMARY OF THE INVENTION

In view of the above described disadvantage, it is an object of the present invention to provide a booster type converter by which it makes possible to conduct a switching operation of electric current in a state where a voltage switched by a switching element is a zero voltage or the one close thereto, and to decrease a switching loss in an electric current switching circuit constituted by a switching element such as a power MOSFET element.

According to the invention, a booster type converter, comprises:

a boosting inductor being constituted from a transformer provided with an auxiliary winding, a capacitor being connected to the auxiliary winding, whereby the capacitor being charged by means of resonance of a leakage inductance of the transformer and the capacitor, and at the same time, it making possible to conduct zero voltage switching of the booster type converter on the basis of the electric charge charged in the capacitor, thereby to decrease a switching loss.

DETAILED DESCRIPTION OF THE PREFERRED EMBODIMENTS

Figure 1A:
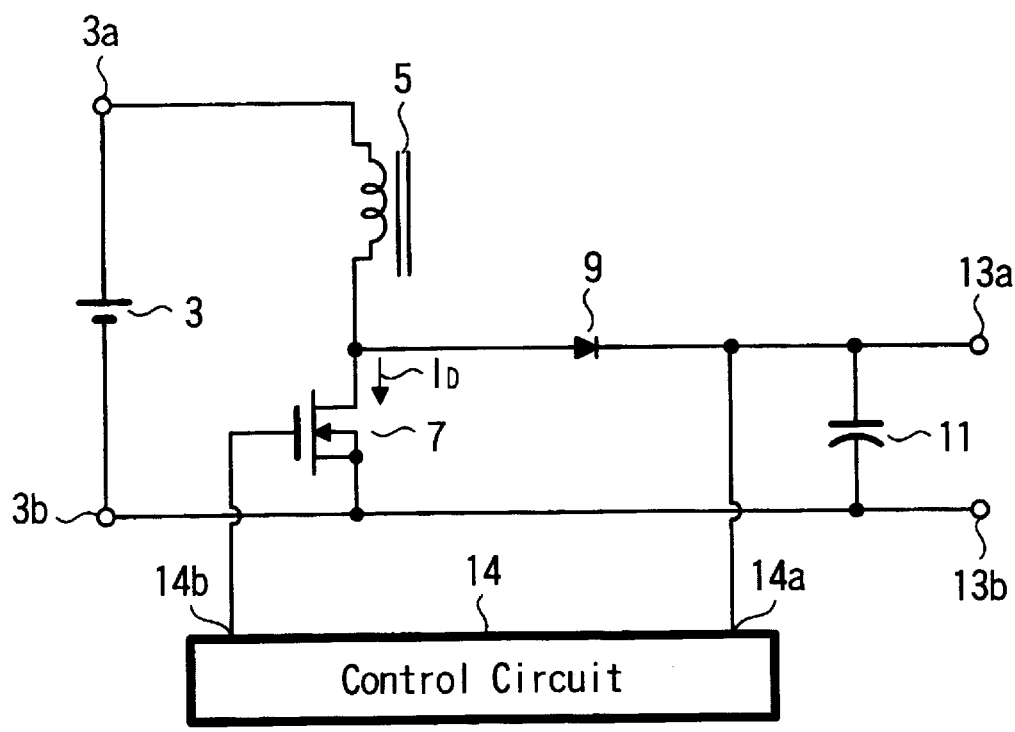
FIG. 1A is a block diagram showing an electric circuit used for explaining a conventional booster type converter.

An example of preferred embodiments of the booster type converter according to the present invention will be described hereinafter by referring to FIGS. 2A and 2B through FIG. 5 wherein the same or like parts in FIGS. 2A and 2B through FIG. 4 are designated by the same reference numerals as those of FIGS. 1A and 1B and a detailed description therefor will be omitted.

Figure 2A:
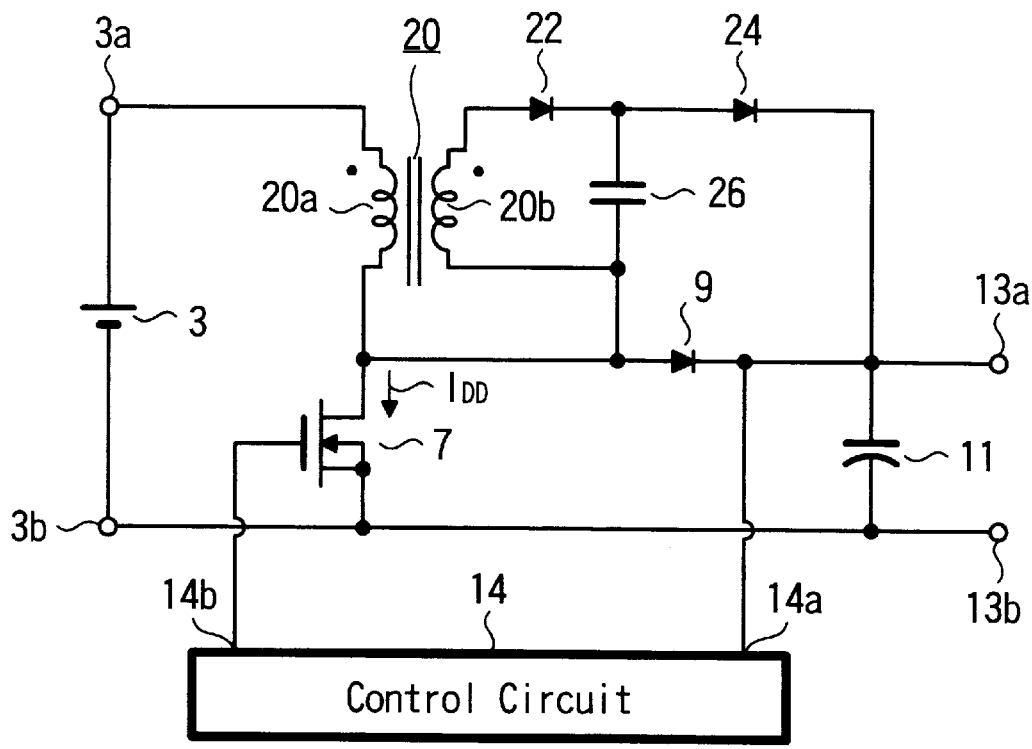
FIG. 2A is an electric circuit diagram showing an example of an embodiment of the booster type converter according to the present invention.

FIG. 2A is a block diagram showing an essential part of an example of a booster type converter 19 of the present invention. The booster type converter 19 comprises a transformer 20 provided with a primary winding 20a and a secondary winding 20b, a first diode 22 for blocking a reverse-current, a second diode 24 for blocking a reverse-current, and a resonating capacitor 26.

In the above described constitution, a winding starting side of the primary winding 20a is connected to the + output terminal 3a of the DC power source 3, a winding terminating side of the primary winding 20a is connected to the drain side of the power MOSFET element 7, a winding starting side of the secondary winding 20b is connected to an anode side of the first diode 22 for blocking the reverse-current, a cathode side of the first diode 22 is connected to an anode side of the second diode 24 for blocking the reverse-current as well as to one side of the resonating capacitor 26, the other side of the resonating capacitor 26 is connected to the winding terminating side of the secondary winding 20b, the control signal input end 14a of the control circuit 14 is connected to a + pole side of the smoothing capacitor 11, and the switching signal output end 14b of the control circuit 14 is connected to a gate side of the power MOSFET element 7, respectively.

Furthermore, a connecting midpoint defined between the other end side of the resonating capacitor 26 and the winding terminating side of the secondary winding 20b is connected to the drain side of the power MOSFET element 7 as well as to an anode side of the main diode element 9, a cathode side of the second diode 24 for blocking the reverse-current is connected to the cathode side of the main diode element 9 as well as to the + pole side of the smoothing capacitor 11, the + pole side of the smoothing capacitor 11 is connected to the + output terminal 13a, a − pole side of the smoothing capacitor 11 is connected to the − output terminal 13b, the source side of the power MOSFET element 7 is connected to the − pole side of the smoothing capacitor 11 as well as to the output terminal 3b of the DC power source 3, whereby the booster type converter 19 is constituted.

Operations of the booster type converter 19 the constitution of which has been explained in conjunction with FIG. 2A will be described herein by referring to FIG. 2B, FIGS. 3A and 3B.

Figure 3A:
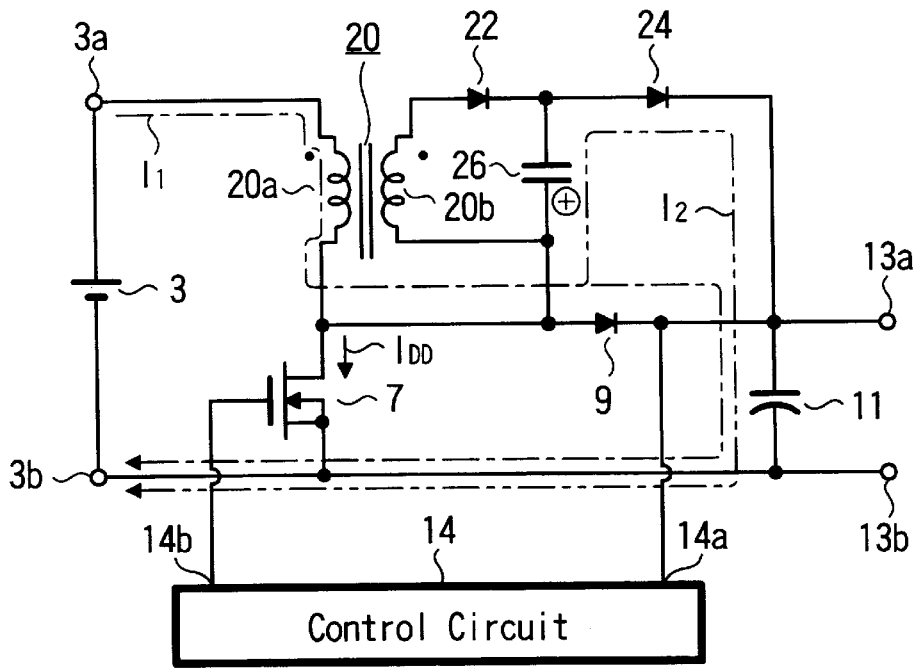
FIG. 3A is an electric circuit diagram used for explaining flow of a signal.

FIG. 3A is a circuit diagram used for explaining operations in the case where the power MOSFET element 7 in a turn-on state is turned OFF under the control of the control circuit 14 in the booster type converter 19 the constitution of which is shown in FIG. 2A and has been described in conjunction therewith. FIG. 3B is a circuit diagram used for explaining operations in the case where the power MOSFET element 7 in a turn-off state is turned ON under the control of the control circuit 14 in the booster type converter 19 the constitution of which is shown in FIG. 2A and has been described in conjunction therewith.

In FIG. 3A, when the power MOSFET element 7 in the turn-on state shifts the the turn-off state, a first electric current passage $I_1$ starting from the + output terminal 3a of the DC power source 3 and returning to the − output terminal 3b of the DC power source 3 through the primary winding 20a, the main diode element 9 and the smoothing capacitor 11 is formed, and the voltage produced in order to release the energy accumulated in the primary winding 20a in the case where the power MOSFET element 7 is in the turn-on state, is superposed on a voltage in the DC power source 3, whereby such voltage which is the one obtained by boosting the voltage in the DC power source 3 is accumulated in the smoothing capacitor 11.

Furthermore, when the above described turn-on state shifts to the turn-off state, a second electric current passage $I_2$ starting from the + output terminal 3a of the DC power source 3 and returning to the − output terminal 3b of the DC current source 3 through the output terminal 3a of the DC power source 3, the primary winding 20a, the resonating capacitor 26, the second diode 24 for blocking the reverse-current and the smoothing capacitor 11 is formed other than the first electric current passage $I_1$.

Figure 1B:
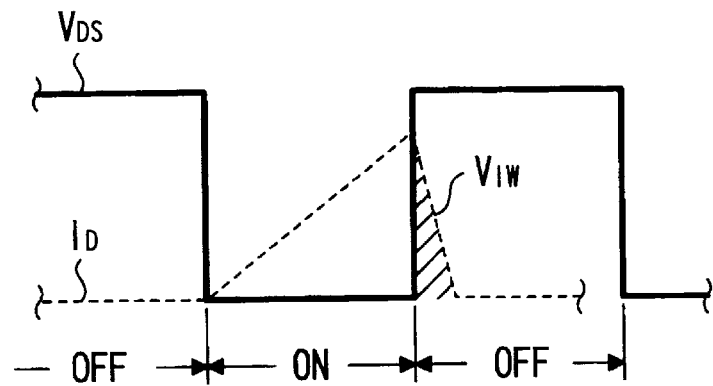
FIG. 1B is a waveform diagram used for explaining an operation of the electric circuit shown in FIG. 1A.
Figure 2B:
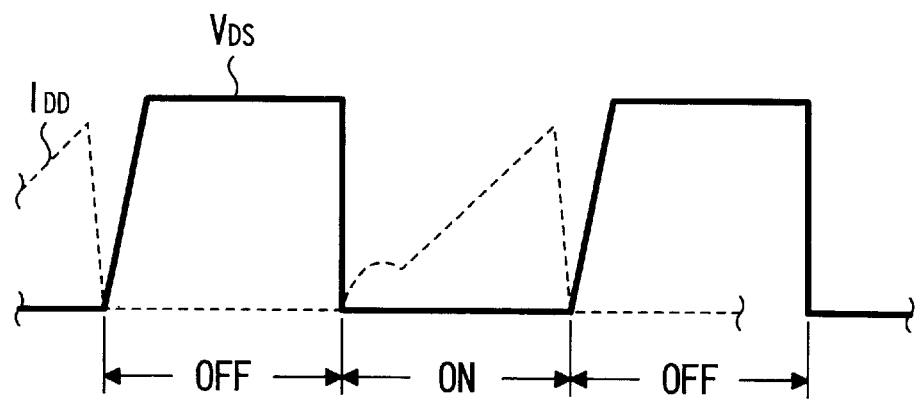
FIG. 2B is a waveform diagram used for explaining an operation of the electric circuit shown in FIG. 2A.

A leading edge waveform of a drain voltage $V_{DS}$ in the case where the power MOSFET element 7 in the turn-on state is made to be the turn-off state with a current flowing through the second electric current passage $I_2$ by means of the control section 14 is inclined as shown in FIG. 2B, whereby production of of the overlapped area VIW of the voltage $V_{DS}$ existing between the drain and the source of the power MOSFET element 7 with a drain current $I_{DD}$ which is shown in FIG. 1B and has been explained is suppressed, so that it makes possible to effect electric current switching operation in a zero voltage state or a state close thereto, and as a result, a switching loss produced due to existence of the overlapped area VIW can be remarkably reduced.

Figure 3B:
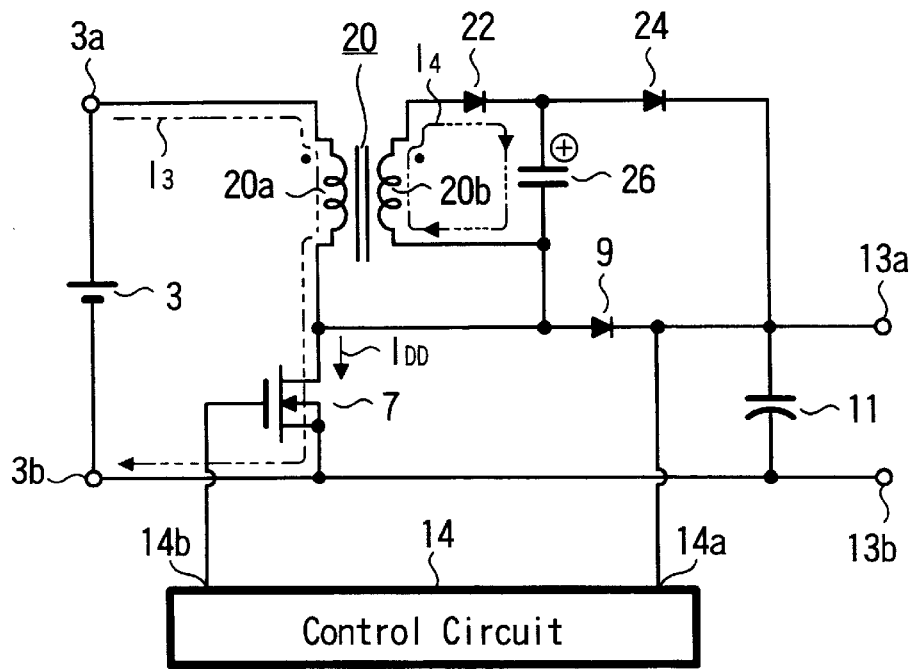
FIG. 3B is an electric circuit diagram used for explaining a flow of another signal.

On one hand, when the power MOSFET element 7 in the turn-off state shifts to the turn-on state, a third electric current passage $I_3$ starting from the + output terminal 3a of the DC power source 3 and returning to the − output terminal 3b of the DC power source 3 through the primary winding 20a, and the power MOSFET element 7 is formed, whereby electromagnetic energy is accumulated in the transformer 20, and at the same time, a fourth electric current passage $I_4$ starting from the winding starting end of the secondary winding 20b and the winding terminating end of the secondary winding 20b through the first diode 22 for blocking the reverse-current, and the resonating capacitor 26 is formed, whereby the resonating capacitor 26 is charged in a polarity wherein a side connected to the cathode side of the first diode 22 for blocking the reverse-current becomes plus (+) as shown in FIG. 3B.

The electric current flowing through the fourth electric passage $I_4$ is produced by the resonating current of a leakage inductance of the transformer 20 and the resonating capacitor 26. A resonating current $I_4$ flowing through the resonating capacitor 26 appears at the time of rising edge of the electric current flowing through the third electric current passage $I_3$, and the resonating current continues to flow until a voltage value accumulated in the resonating capacitor 26 reaches a value of voltage which is produced in the secondary winding 20b in response to a winding ratio of the primary winding 20a to the secondary winding 20b of the transformer 20.

More specifically, since the resonating capacitor 26 is charged in a polarity shown in FIG. 3B with the resonating current $I_4$ during a period wherein the power MOSFET element 7 is in the turn-on state, a current can be made to pass through the second current passage $I_2$ in the case where the power MOSFET element 7 in the above described turn-on state shifts to the turn-off state. Furthermore, the electric charge which has been accumulated in the resonating capacitor 26 is discharged by the electric current flowing through the second electric current passage $I_2$, whereby it is accumulated in the smoothing capacitor 11, or it is consumed with a load through the + output terminal 13a and the − output terminal 13b, and accordingly, the electric charge accumulated in the resonating capacitor 26 is not consumed uselessly, but it is efficiently utilized.

Figure 4:
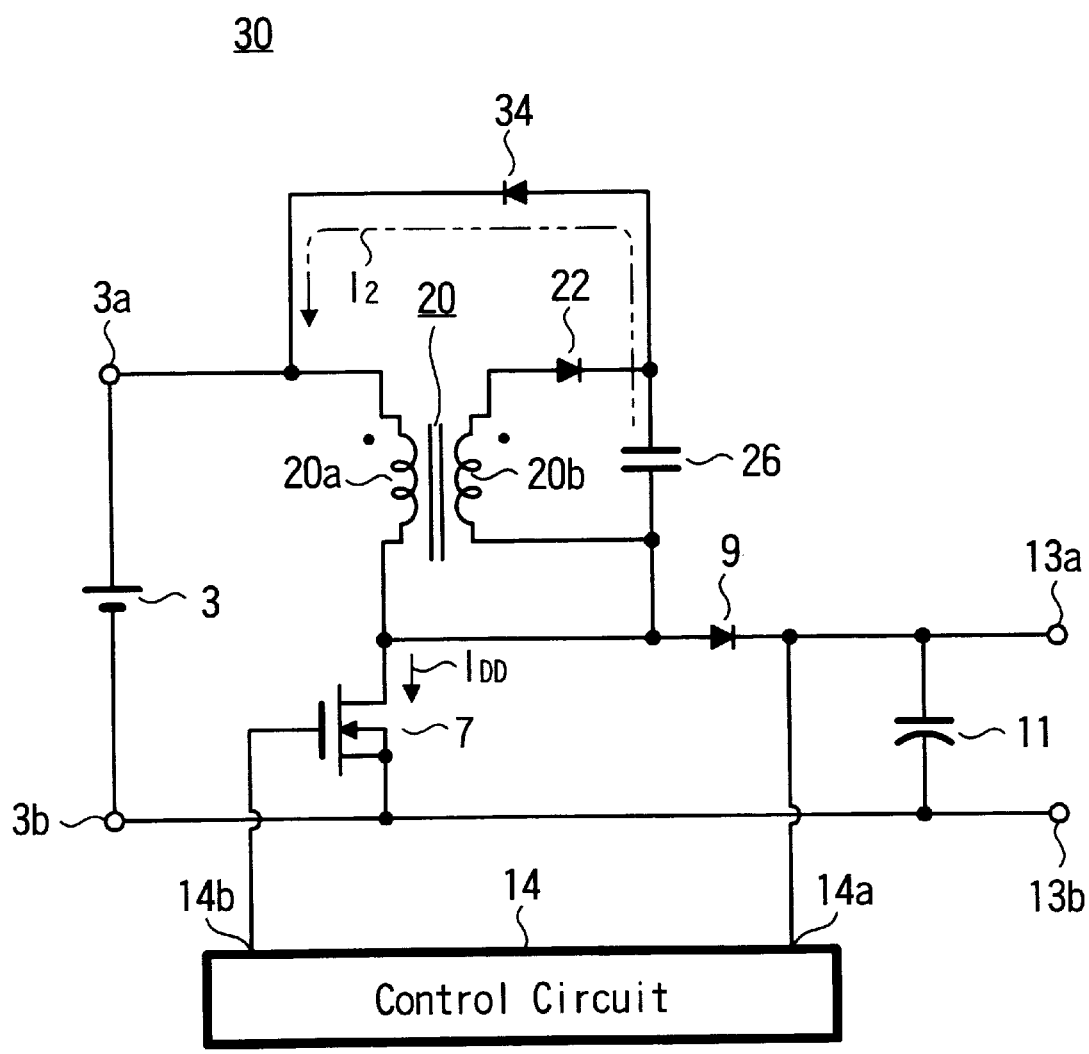
FIG. 4 is an electric circuit diagram used for explaining another example of the embodiment of the booster type converter according to the present invention.

In the following, another preferred embodiment of the booster type converter according to the present invention will be described with respect to FIG. 4. In FIG. 4, the same or like parts as those in FIGS. 2A, 2B and FIGS. 3A and 3B are designated by the same reference numerals, and the detailed description therefor will be omitted.

A preferred embodiment shown in FIG. 4 corresponds to a booster type converter 30 which is arranged in such that the electric charge charged in a resonating capacitor 26 is fed back to a side of a primary winding 20a of a transformer 20 through a second diode 34 for blocking a reverse-current during a period wherein a power MOSFET element 7 is in a turn-off state. The resulting advantages obtained from the above described booster type converter 30 are equal to those obtained by the preferred embodiment shown in FIG. 2 and described with respect thereto.

According to the embodiments shown and described in FIGS. 2A, 2B, 3A, 3B, and FIG. 4 (hereinafter referred to as "preferred embodiments"), the resonating capacitor 26 has been charged with the resonance obtained by a leakage inductance of the transformer 20 and the resonating capacitor 26 in the case where the power MOSFET element 7 in the turn-off state shifts to the turn-on state, whereby an electric current can be passed through the second electric current passage $I_2$ at the time when the power MOSFET element 7 in the turn-on state shifts to the turn-off state. As a result, a leading edge signal waveform of a drain voltage $V_{DS}$ in the case when the power MOSFET element 7 in the turn-on state shifts to the turn-off state is inclined to delay the rising edge of the drain voltage $V_{DS}$. Thus, the overlapped area VIW of the voltage $V_{DS}$ existing between the drain and the source of the power transistor element 7 with the drain current $I_{DD}$ can be reduced remarkably, whereby useless consumption of electric power in the power MOSFET element 7 can be reduced.

Further, according to the preferred embodiments, the electric charge charged in the resonating capacitor 26 in the case when the power MOSFET element 7 in the turn-off state shifts to the turn-on state is accumulated in the smoothing capacitor 11 through the second current passage $I_2$ in case of shifting the element 7 in the turn-on state to the turn-off state, or the electric charge comes to be consumed in a load through the + output terminal 13a and the − output terminal 13b. Accordingly, the electric charge charged in the resonating capacitor 26 can be effectively utilized without consuming it uselessly.

Moreover, according to the preferred embodiments, since the switching loss can be reduced in the booster type converter, it is intended to obtain higher efficiency in the booster type converter.

Still further, according to the preferred embodiments, since the switching loss can be reduced, it may be intended to obtain a higher switching frequency in the booster type converter, so that it becomes possible to make the boosting inductor and the smoothing capacitor 11 to be a smaller capacity or the like, and accordingly it is possible to intend down-sizing of the booster type converter.

Yet further, according to the preferred embodiments, since it can be intended to reduce the switching loss in the booster type converter by a simple circuit structure, it is possible to lower a cost of the booster type converter.

Furthermore, according to the preferred embodiments, as is apparent from a comparison of a conventional constitution shown and described in FIG. 1A with that of the preferred embodiments shown and described in FIGS. 2A and 4, there is no need of modifying a conventional structure with respect to that of a boosting section itself, so that it is possible to use IC parts which are available in the current situation in the boosting section. Thus, it is sufficient to add a necessary structure for forming the second electric current passage $I_2$ and the fourth electric current passage $I_4$ to the boosting section. Accordingly, it is very simple to constitute the booster type converter according to the preferred embodiments with the use of a conventional booster type converter as its base, while an advantage of an excellent improvement in a switching loss in a conventional booster type converter can be achieved in the preferred embodiments.

Moreover, according to the preferred embodiments, it can be intended also to achieve such an improvement that a switching loss is reduced in a booster type converter in the case where the present invention is applied to even a converter of a switching frequency variable type other than that of a switching duty variable type which has been described hereinbefore as an output voltage controlling system by means of the control circuit 14.

Still further, according to the preferred embodiments, it is possible to intend the realization of a booster type converter of an active filter type exhibiting high efficiency and having a small size and a low cost.

Yet further, according to the preferred embodiments, since it makes possible to be such an electric current switching operation in a state where a voltage which is switched by a switching element is in zero voltage or a state close thereto in an electric current switching circuit composed of a switching element such as a power MOSFET element, reduction of unnecessary radiation from the booster type converter can be realized, so that it is possible to intend to easily obtain countermeasures for unnecessary radiation such as EMI or the like in a power unit.

While an embodiment wherein the present invention is applied to a single booster type converter has been described in the preferred embodiments, it is not limited to such a case where the present invention is applied to a single booster type converter, and the preferred embodiments are applicable for a variety of equipments and installations such as a case where a booster type converter is applied as a part of power unit, and a case where a booster type converter is applied to a power source section of electronic equipment so far as it is within a scope of the spirit of the present invention.

Next, a preferred embodiment of power unit in the case where a booster type converter is applied for achieving an object of improving a power factor on the input side of an AC power source will be described.

Figure 5:
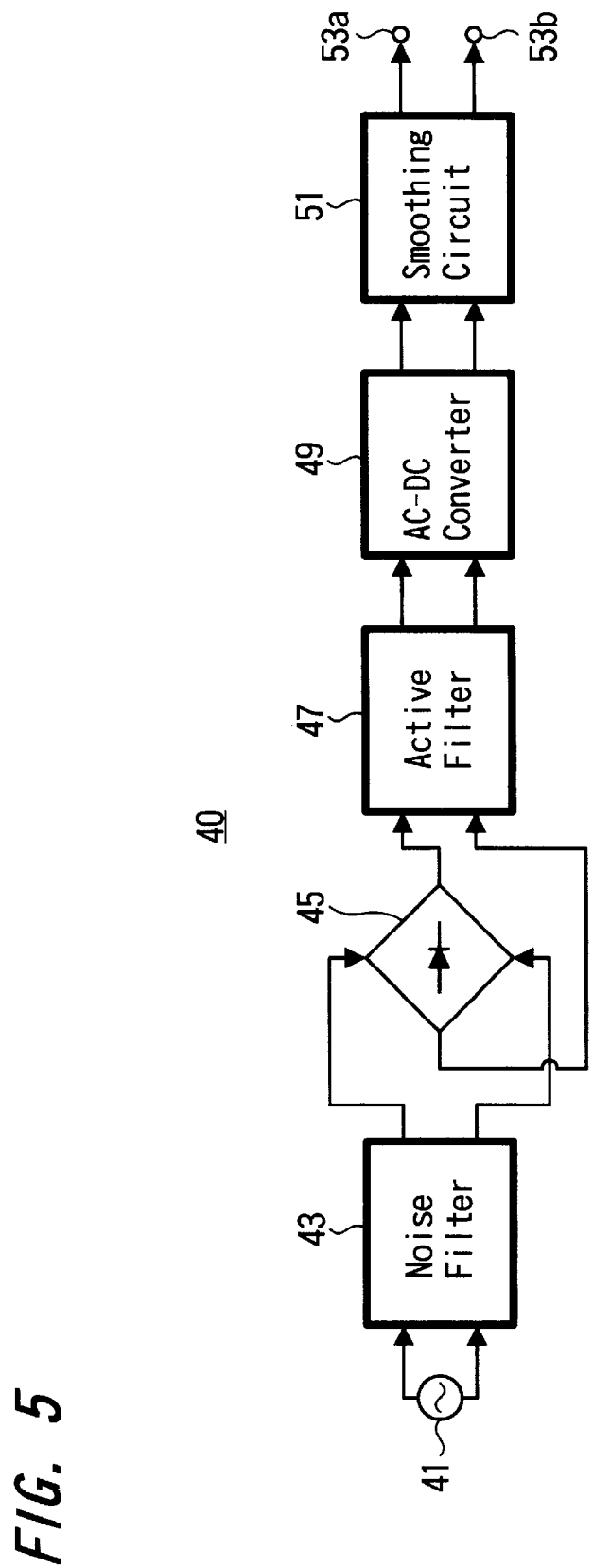
FIG. 5 is a circuitry diagram used for explaining an example of an application of the booster type converter according to the present invention.

FIG. 5 is a circuitry block diagram showing a preferred embodiment of a power unit wherein the booster type converter shown and described in FIG. 2A or FIG. 4 is applied to an active filter section of an AC power source input-DC output type power unit, and improvements in power factor on the AC power source side are intended.

In FIG. 5, reference numeral 40 designates the whole essential part of a power unit. The power unit 40 comprises an AC power source 41, a noise filter 43, a full-wave rectifying section 45, an active filter 47 composed of the booster type converter 19 shown in FIG. 2A or the booster type converter 30 shown in FIG. 4, an AC-DC converter 49, a smoothing section 51, and a DC power source voltage output terminals 53a and 53b.

In this arrangement, an AC power source signal from which unnecessary noise components are removed as a result of supplying an AC power source signal to the noise filter 43 from the AC power source 41 is supplied to the full-wave rectifying section 45 from the noise filter 43, the AC power source signal is subjected to full-wave rectification to obtain a pulsating power source signal in the full-wave rectifying section 45, the resulting pulsating power source signal is supplied to the active filter section 47, a DC voltage wherein the pulsating power source signal has been boosted by means of the booster type converter 19 or 30 constituting the active filter 47 is obtained, thereafter, the DC voltage is converted into an AC power source signal, the resulting AC power source signal is supplied to the AC-DC converter 49 in which the AC power source signal is converted into a DC power source signal having a predetermined voltage value, the resulting DC power source signal is supplied to the smoothing section 51 to remove its ripple components, and the DC power source signal from which ripple components have been removed is output from the DC power source voltage output terminals 53a and 53b.

According to the preferred embodiment shown in FIG. 5, in the case where the pulsating power source signal produced by removing unnecessary noise components from an AC power source signal and full-wave rectifying the resulting AC power source signal is input to the active filter 47 which is constituted from the booster type converter 19 or 30 wherein a DC voltage boosted by switching operation is obtained, since the switching frequency is made to be a higher frequency value in comparison with that of a conventional booster type converter, electric current waveform distortion appearing in the AC power source signal on the side of the AC power source 41 can be remarkably reduced. Accordingly, there is such an advantage that a power factor of the AC power source signal input from the AC power 41 can be farther improved than that of the conventional one.

According to the present invention, it becomes possible to effect electric current switching operations in a zero voltage state in a booster type converter, so that a switching loss can be reduced, whereby it is possible to contemplate to achieve the booster type converter having higher efficiency.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A booster type converter, comprising:
   a switching element for providing the output of said converter, said output being low when said switching element is in an on state and being high when said switching element is in an off state;
   a boosting inductor coupled to said switching element and making up part of a transformer provided with an auxiliary winding, and
   a capacitor being connected to said auxiliary winding,
   wherein when said switching element is in said on state current flowing through said auxiliary winding charges said capacitor, and when said switching element is switched to said off state said capacitor discharges and the discharging of the capacitor delays the rise of the output of the converter so as to decrease the voltage-current product across said switching element and thereby decrease the power dissipated in said switching element.

2. A booster type converter as claimed in claim 1, wherein the constitution of said booster type converter is arranged such that a pulsating current obtained by rectifying an input of an AC power source with a rectifying means is to be input to said converter, thereby to improve a power factor.

* * * * *